(12) United States Patent
Sugawara et al.

(10) Patent No.: US 11,091,031 B2
(45) Date of Patent: Aug. 17, 2021

(54) DRIVE FORCE CONTROL SYSTEM FOR VEHICLE

(71) Applicant: TOYOTA JIDOSHA KABUSHIKI KAISHA, Toyota (JP)

(72) Inventors: Akio Sugawara, Toyota (JP); Kunihiko Usui, Fuji (JP); Ryosuke Ikemura, Susono (JP); Keisuke Ushida, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/076,266

(22) Filed: Oct. 21, 2020

(65) Prior Publication Data

US 2021/0129667 A1 May 6, 2021

(30) Foreign Application Priority Data

Nov. 5, 2019 (JP) .............................. JP2019-200632

(51) Int. Cl.
| | |
|---|---|
| *B60K 23/08* | (2006.01) |
| *B60K 17/35* | (2006.01) |
| *B60W 20/10* | (2016.01) |
| *B60K 6/52* | (2007.10) |

(52) U.S. Cl.
CPC ............ *B60K 23/0808* (2013.01); *B60K 6/52* (2013.01); *B60K 17/3505* (2013.01); *B60W 20/10* (2013.01); *B60W 2520/26* (2013.01); *B60W 2710/207* (2013.01)

(58) Field of Classification Search
CPC .. B60K 23/0808; B60K 6/52; B60K 17/3505; B60W 20/10; B60W 2710/207; B60W 2520/26
See application file for complete search history.

(56) References Cited

U.S. PATENT DOCUMENTS

| | | | |
|---|---|---|---|
| 2005/0150702 A1 | 7/2005 | Matsuzaki | |
| 2016/0121883 A1* | 5/2016 | Mao | B60W 20/108 701/69 |
| 2018/0134152 A1* | 5/2018 | Nagayama | B60K 17/02 |
| 2018/0339698 A1* | 11/2018 | Hock | B60K 6/448 |
| 2020/0055408 A1* | 2/2020 | Wein | B60K 17/356 |

FOREIGN PATENT DOCUMENTS

JP          2005-186756 A          7/2005

\* cited by examiner

*Primary Examiner* — Justin Holmes
(74) *Attorney, Agent, or Firm* — Sughrue Mion, PLLC

(57) ABSTRACT

A drive force control system for a vehicle configured to allow a driver to find out a steering angle at which a wheel grips a road surface. In the vehicle, a torque distribution ratio to a pair of wheels turned by a steering wheel and another pair of wheels is changeable. A controller restricts a control to change the torque distribution ratio in the event of a slip of the pair of wheels, if a steering angle of the pair of wheels is changed to allow the pair of wheels to grip a road surface.

12 Claims, 2 Drawing Sheets

DRIVE FORCE CONTROL SYSTEM FOR VEHICLE

CROSS REFERENCE TO RELATED APPLICATIONS

The present disclosure claims the benefit of Japanese Patent Application No. 2019-200632 filed on Nov. 5, 2019 with the Japanese Patent Office, the disclosures of which are incorporated herein by reference in its entirety.

BACKGROUND

Field of the Disclosure

Embodiments of the present disclosure relate to the art of a drive force control system for a vehicle configured to control torques of at least two wheels independently.

Discussion of the Related Art

JP-A-2005-186756 describes a four-wheel drive system that propels an automotive vehicle by transmitting an engine torque to a pair of front wheels, and transmitting a motor torque to a pair of rear wheels. According to the teachings of JP-A-2005-186756, when a rear wheel slip is sensed, the motor torque transmitted to the rear wheels is reduced, and then increased to a value lower than that at the time when the slip due to a spin has been sensed. If the slip remains even after increasing the motor torque, the above-explained torque adjustment is continuously repeated under the condition that the raised torque is made lower than that in the last operation until the slip is eliminated.

The four-wheel drive system described in JP-A-2005-186756 is configured to change the motor torque irrespective of a required driving force governed by a position of an accelerator pedal. For example, in the event of a slip of at least one of steered wheels on a bumpy or rocky road, a driver would try to make the slipping wheel to grip a road surface by turning the steered wheels by rotating a steering wheel. In this situation, if the motor torque is changed irrespective of a position of an accelerator pedal as taught by JP-A-2005-186756, the driver may not determine whether the slipping wheel grips the road surface again by controlling the motor torque automatically or by turning the slipping wheel by rotating the steering wheel. That is, the driver is not allowed to find out a steering angle of the wheel possible to grip the road surface.

SUMMARY

Aspects of embodiments of the present disclosure have been conceived noting the foregoing technical problems, and it is therefore an object of the present disclosure to provide a drive force control system for a vehicle configured to allow the driver to find out a steering angle at which a wheel grips a road surface.

The drive force control system according to the exemplary embodiment of the present disclosure is applied to a vehicle, comprising: a prime mover; a pair of wheels that is rotated by a torque delivered from the prime mover and that is turned by operating a steering wheel; and another pair of wheels that is rotated by a torque delivered from the prime mover or another prime mover. According to the exemplary embodiment of the present disclosure, a torque distribution ratio to the pair of wheels and the another pair of wheels is changeable, and the drive force control system comprises a controller that controls the torque distribution ratio. In order to achieve the above-explained objective, according to the exemplary embodiment of the present disclosure, the controller is configured to: determine whether the vehicle cannot be propelled due to a slip of the pair of wheels steered by the steering wheel; determine that a steering angle of the pair of wheels is changed by operating the steering wheel to allow the pair of wheels to grip a road surface; and restrict a control to change the torque distribution ratio to the pair of wheels steered by the steering wheel and the another pair of wheels in the event of the slip of the pair of wheels, if the steering angle of the pair of wheels is changed to allow the pair of wheels to grip the road surface.

In a non-limiting embodiment, the prime mover may be connected to the pair of wheels that is turned by operating the steering wheel, and the another prime mover may be connected to the another pair of wheels. The torque distribution ratio to the pair of wheels and the another pair of wheels may be changed by changing the torques generated by the prime mover and the another prime mover.

In a non-limiting embodiment, the prime mover may include a motor, and the another prime mover may include an engine.

In a non-limiting embodiment, the controller may be further configured to determine that the vehicle cannot be propelled due to the slip of the pair of wheels steered by the steering wheel, if a rotational speed of the pair of wheels is higher than a first predetermined speed and a rotational speed of the another pair of wheels is lower than a second predetermined speed.

In a non-limiting embodiment, controller may be further configured to determine that the steering angle of the pair of wheels is changed by operating the steering wheel to allow the pair of wheels to grip the road surface, if a change rate of a rotational angle of the steering wheel is equal to or greater than a predetermined rate.

Thus, according to the exemplary embodiment of the present disclosure, the controller restricts the control to change the torque distribution ratio to the pair of wheels steered by the steering wheel and the another pair of wheels in the event of a slip of the pair of wheels, if the steering angle of the pair of wheels is changed to allow the pair of wheels to grip a road surface. According to the exemplary embodiment of the present disclosure, therefore, the torque of the pair of wheels steered by the steering wheel will not be changed automatically against the driver's intention. For this reason, the driver is allowed to determine that the pair of wheels are allowed to grip the road surface again by operating the steering wheel. In addition, a steering angle at which the pair of wheels grip a bumpy road surface can be found by rotating the steering wheel even when the torque delivered to the another pair of wheels is increased to the limit torque at which the another pair of wheels slip. According to the exemplary embodiment of the present disclosure, therefore, the vehicle being stuck on the bumpy road may be propelled again without reducing the drive force excessively.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
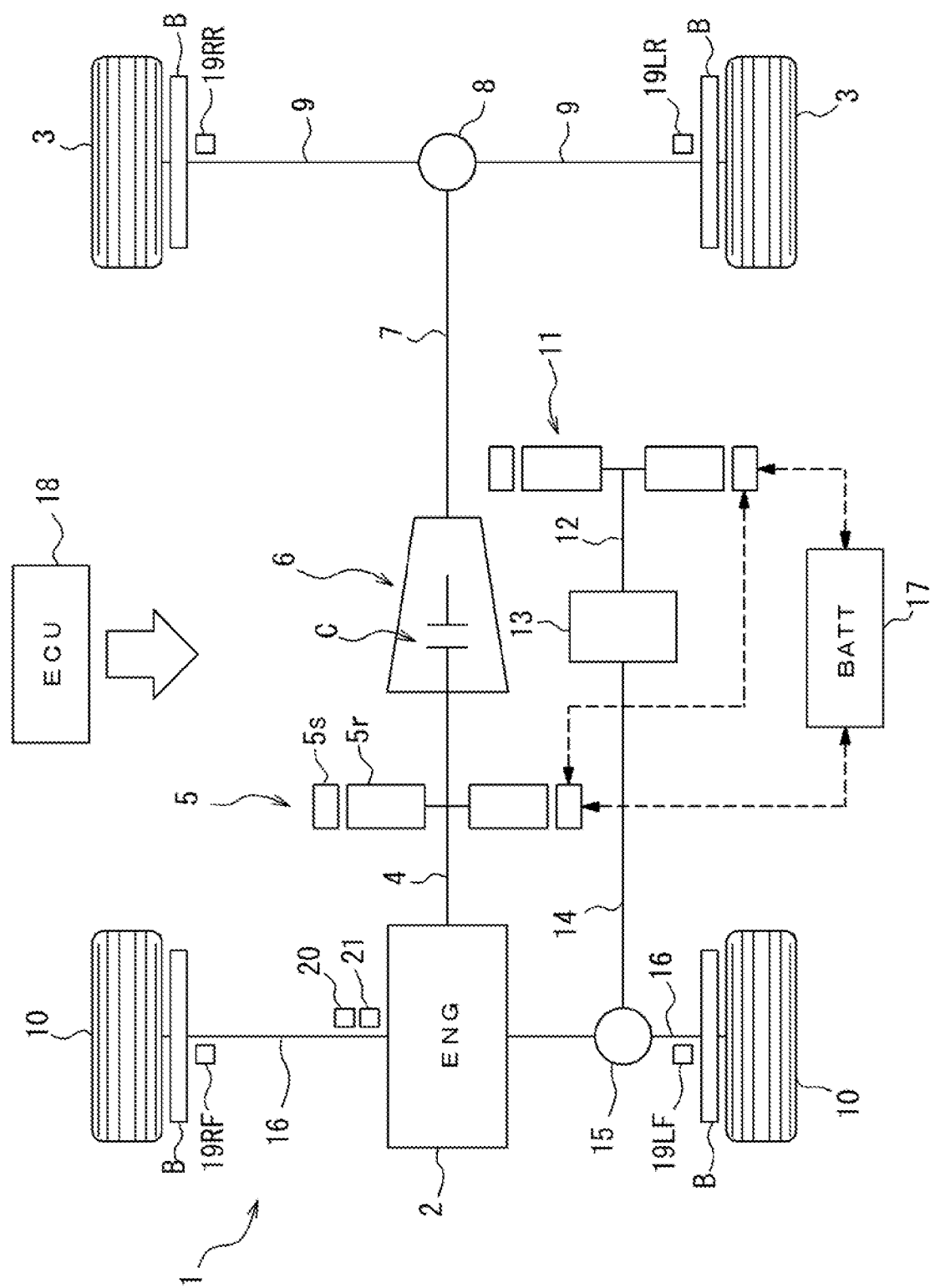
FIG. 1 is a schematic illustration showing one example of a structure of a vehicle to which the drive force control system according to the embodiment of the present disclosure is applied.

Embodiments of the present disclosure will now be explained with reference to the accompanying drawings. Turning now to FIG. 1, there is shown a structure of a vehicle 1 to which the drive force control system according to the embodiment of the present disclosure is applied. The vehicle 1 is a front-engine/rear-drive layout vehicle in which an engine (referred to as "ENG" in FIG. 1) 2 is arranged in a front section of the vehicle 1, and a power generated by the engine 2 is delivered to a pair of rear wheels 3 as "drive wheels" of the embodiment.

The engine 2 is arranged in such a manner that an output shaft 4 thereof extends in a longitudinal direction of the vehicle 1, and an electricity-generating motor 5 is arranged on the output shaft 4 to be rotated integrally with the output shaft 4. For example, a permanent magnet synchronous motor may be adopted as the electricity-generating motor 5, and in the electricity-generating motor 5, a rotor 5r is fixed to the output shaft 4 and a stator 5s is connected to a stationary member such as a casing (not shown). In the vehicle 1, therefore, the power generated by the engine 2 may be translated partially into an electric power by energizing the electricity-generating motor 5 to reduce a rotational speed of the engine 2. Optionally, the electricity-generating motor 5 may have a function to generate a torque to assist a torque generated by the engine 2, and a function to crank the engine 2.

The output shaft 4 of the engine 2 further extends from the electricity-generating motor 5 to a rear section of the vehicle 1, and a leading end of the output shaft 4 is connected to an automatic transmission (as will be simply called the "transmission" hereinafter) 6 that changes a speed ratio. For example, a geared transmission that changes a speed ratio stepwise, and a continuously variable transmission that changes a speed ratio continuously may be adopted as the transmission 6. The transmission 6 is provided with a plurality of clutch devices or brake devices (as will be simply called the "engagement device" hereinafter) C. In the transmission 6, a predetermined gear stage is established by engaging at least one of the engagement devices C. Here, only one of the engagement devices C is illustrated in FIG. 1 for the sake of illustration.

The transmission 6 is connected to the rear wheels 3 through a rear propeller shaft 7, a rear differential unit 8, and rear driveshafts 9.

In order to rotate a pair of front wheels 10 as "steered wheels" of the embodiment, the vehicle 1 is provided with a drive motor 11 as a "motor" of the embodiment. Thus, the vehicle 1 is a four-wheel drive layout vehicle in which the rear wheels 3 are driven by the engine 2, and the front wheels 10 are driven by the drive motor 11. For example, a permanent magnet synchronous motor may also be adopted as the drive motor 11. That is, the drive motor 11 serves not only as a motor to generate a torque delivered to the front wheels 10 to propel the vehicle 1, but also as a generator to translate a kinetic energy of the vehicle into an electric power by generating a torque in a direction to reduce a rotational speed of the front wheels 10.

In the vehicle 1 shown in FIG. 1, the drive motor 11 is arranged in a central or rear section of the vehicle 1 in such a manner that an output shaft 12 thereof extends toward the front section of the vehicle 1, and a leading end of the output shaft 12 is connected to an automatic transmission (as will be simply called the "transmission" hereinafter) 13. For example, a transmission in which a gear stage can be selected from three or more stages may be adopted as the transmission 13. Instead, the transmission 13 may also be a transmission in which a gear stage is selected from: a fixed stage in which a speed ratio is 1; and a speed reducing stage in which an input speed from the output shaft 12 is higher than an output speed from an after-mentioned front propeller shaft 14. Further, the transmission 13 may also be a continuously variable transmission in which a speed ratio is varied continuously.

The transmission 13 is connected to the front wheels 10 through the front propeller shaft 14, a front differential unit 15, and front driveshafts 16.

The electricity-generating motor 5 and the drive motor 11 are connected electrically with an electric storage device (referred to as "BATT" in FIG. 1) 17 so that electricity is supplied from the electric storage device 17 to those motors 5 and 11, and that electricity generated by those motors 5 and 11 is accumulated in the electric storage device 17. For example, a lithium ion battery, a capacitor, and an all-solid-state battery may be adopted as the electric storage device 17. The electricity-generating motor 5 and the drive motor 11 are also connected electrically with each other so that the electricity generated by one of the motors 5 and 11 is supplied directly to the other one of the motors 5 and 11 without passing through the electric storage device 17. That is, an output power of the engine 2 may be translated partially into an electric power by the electricity-generating motor 5, and the electricity translated by the electricity-generating motor 5 may be supplied directly from the electricity-generating motor 5 to the drive motor 11.

In order to apply brake force to the vehicle 1, each of the front wheels 10 and rear wheels 3 is individually provided with an electric brake (as will be simply called the "brake" hereinafter) B that generates brake force by e.g., an electromagnetic actuator.

An operating mode of the vehicle 1 may be selected from: an engine mode in which the vehicle 1 is propelled by delivering an output torque of the engine 2 to the rear wheels 3; an electric vehicle mode in which the vehicle 1 is propelled by delivering an output torque of the drive motor 11 to the front wheels 10; and a hybrid mode in which the vehicle 1 is propelled by delivering the output torque of the engine 2 to the rear wheels 3 while delivering the output torque of the drive motor 11 to the front wheels 10.

In the engine mode, the gear stage of the transmission 6 is determined with reference to a map determining the gear stage based on a speed of the vehicle 1 and a required drive force to propel the vehicle 1, and a predetermined engagement device C is engaged to establish the determined gear stage.

In the electric vehicle mode, a predetermined engagement device C is disengaged to bring the transmission 6 into a neutral stage. Specifically, the electric vehicle mode may be selected from: a battery mode in which an electric power required to propel the vehicle 1 is supplied from the electric storage device 17 to the drive motor 11; and a series mode in which an output power of the engine 2 is translated into an electric power by the electricity-generating motor 5, and the electric power translated by the electricity-generating motor 5 is supplied to the drive motor 11 to propel the vehicle 1. In the series mode, the required electric power to propel the vehicle 1 may also be supplied to the drive motor 11 from the electric storage device 17 at least partially.

In the hybrid mode, a ratio between a drive force established by the rear wheels 3 and a drive force established by the front wheels 10 may be changed arbitrarily to achieve a required drive force governed by e.g., a position of an accelerator pedal. In addition, in the hybrid mode, not only the electric power translated from a part of the output power of the engine 2 by the electricity-generating motor 5 but also the electric power accumulated in the electric storage device 17 may be supplied to the drive motor 11.

The engine 2, the electricity-generating motor 5, the drive motor 11, the engagement device C, the transmission 13 etc. are controlled by an electronic control unit (to be abbreviated as the "ECU" hereinafter) 18 as a controller. The ECU 18 comprises a microcomputer configured to execute a calculation based on incident data transmitted from various sensors as well as formulas and maps installed in advance. Calculation results are transmitted to the engine 2, the electricity-generating motor 5, the drive motor 11, the engagement device C, the transmission 13 etc. in the form of command signal.

For example, the ECU 18 receives data from: a wheel speed sensor 19RF that detects a speed of the right front wheel 10; a wheel speed sensor 19LF that detects a speed of the left front wheel 10; a wheel speed sensor 19RR that detects a speed of the right rear wheel 3; a wheel speed sensor 19LR that detects a speed of the left rear wheel 3; an accelerator sensor 20 that detects a position of an accelerator pedal (not shown); a steering sensor 21 that detects a rotational angle of a steering wheel (not shown); a battery sensor (not shown) that detects a state of charge level of the electric storage device 17; and a resolver (not shown) that detects speeds of the electricity-generating motor 5 and the drive motor 11.

The maps installed in the ECU 18 include: a map determining a required drive force to propel the vehicle 1 based on a position of the accelerator pedal and a speed of the vehicle 1; and a map determining a gear stage of the transmission 6 based on a position of the accelerator pedal and a speed of the vehicle 1.

The ECU 18 determines an intake air, a fuel injection, and an ignition timing of the engine 2 based on the incident data with reference to the map, and transmits command signals to devices controlling those factors. Likewise, the ECU 18 determines values and frequencies of currents applied to the electricity-generating motor 5 and the drive motor 11 based on the incident data with reference to the map, and transmits command signals to the inverter. Further, the ECU 18 determines gear stages or speed ratios of the transmissions 6 and 13 based on the incident data with reference to the map, and transmits command signals to actuators of the transmissions 6 and 13.

As described, the hybrid mode is a four-wheel drive mode in which the vehicle 1 is propelled by delivering torques to the rear wheels 3 and the front wheels 10, and the hybrid mode is selected when a large drive force is required or when a coefficient of friction between the road surface and wheels 3 and 10 is small. For example, the hybrid mode is selected when travelling on a gravel road, a rocky road, a bumpy road, a frozen road etc., not only automatically by the ECU 18 based on a required drive force, but also manually by operating a switch or the like. According to the exemplary embodiment of the present disclosure, a reference distribution ratio of torque to the front wheels 10 and the rear wheels 3 is set to 50/50, and a distribution ratio of torque to the front wheels 10 and the rear wheels 3 may be changed arbitrarily from the reference distribution ratio depending on e.g., a slip ratio of each of the front wheels 10 and the rear wheels 3, and a vertical load applied to each of the front wheels 10 and the rear wheels 3.

For example, in the event of a slip of at least one of the rear wheels 3, the slipping rear wheel(s) 3 is/are allowed to grip the road surface again while maintaining the drive force to propel the vehicle 1, by reducing the torque delivered to the rear wheels 3 while increasing the torque delivered to the front wheels 10. Specifically, when the wheel slips, the slipping wheel rotates at a speed predetermined rate higher than a speed corresponding to a vehicle speed. By contrast, when the wheel grips the road surface, a speed difference between an actual speed of the wheel and the speed corresponding to a vehicle speed falls below the predetermined rate. According to the exemplary embodiment of the present disclosure, accordingly, definition of "slip" is a condition in which a slip of the wheel on the road surface is large, and definition of "grip" is a condition in which a slip of the wheel on the road surface is small.

When the vehicle 1 travels e.g., on a rocky road, torques of the front wheels 10 and the rear wheels 3 may be increased respectively to a limit torque at which the wheels 10 and 3 slip. In the event of a slip of one of the pairs of the front wheels 10 and the rear wheels 3, if the torque delivered to the slipping pair of wheels is reduced and the torque delivered to the other pair of wheels gripping the road surface is increased as explained above, the other pair of wheels gripping the road surface may start slipping.

For example, in the event of a slip of the front wheel(s) 10 on a rocky road, the driver may rotate the steering wheel to find out a steering angle at which the front wheel(s) 10 grip(s) the road surface. In this situation, the driver determines that the front wheel(s) 10 grip(s) the road surface again based on a change in acceleration of the vehicle 1, a reduction in noise resulting from slippage of the front wheel(s) 10 and so on. Therefore, if the distribution ratio of torque to the front wheels 10 and the rear wheels 3 is changed automatically in this situation, the driver may not determine whether the slipping front wheel(s) 10 grip(s) the road surface again by rotating the steering wheel to turn the slipping front wheel(s) 10, or by changing the distribution ratio of torque to the front wheels 10 and the rear wheels 3 automatically.

Figure 2:
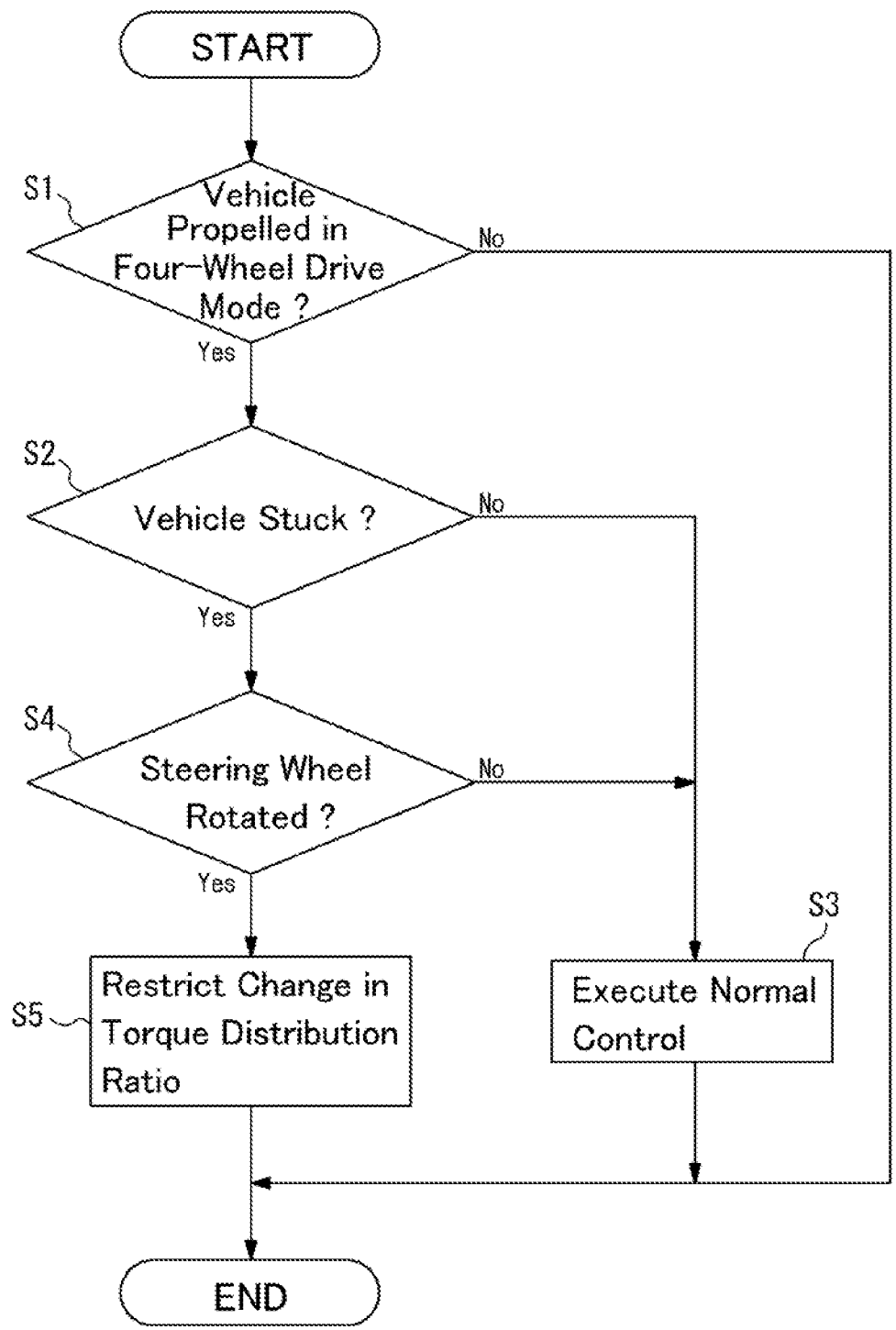
FIG. 2 is a flowchart showing one example of a routine executed by the drive force control system according to the embodiment of the present disclosure.

In order to allow the driver to find out a gipping angle of the slipping wheels on a bumpy road, the drive force control system according to the exemplary embodiment of the present disclosure is configured to restrict the automatic control of the distribution ratio of torque to the front wheels 10 and the rear wheels 3 in the event of a slip of the wheel(s) turned by the steering wheel. To this end, the drive force control system executes the routine shown in FIG. 2. At step S1, it is determined whether the vehicle 1 is propelled in the hybrid mode as the four-wheel drive mode. For example, such determination at step S1 may be made based on a fact that the ECU 18 is transmitting command signals to both of the engine 2 and the drive motor 11 to generate drive torque respectively, a flag representing a selection of the hybrid mode is turned on, both of the engine 2 and the drive motor 11 are activated to achieve a required drive force, or the engagement device C is in engagement.

If the vehicle 1 is not propelled in the hybrid mode so that the answer of step S1 is NO, it is not necessary to change the distribution ratio of torque to the front wheels 10 and the rear wheels 3. In this case, therefore, the routine returns without carrying out any specific control. That is, the vehicle 1 is propelled in the engine mode or the electric vehicle mode.

By contrast, if the vehicle 1 is propelled in the hybrid mode so that the answer of step S1 is YES, the routine progresses to step S2 to determine whether the vehicle is stuck due to a slip of e.g., at least one of the front wheels 10. In other words, it is determined at step S2 whether the vehicle 1 cannot be propelled forward due to a slip of the front wheel(s) 10 e.g., on a rocky road. For example, such determination at step S2 may be made based on a fact that the vehicle 1 is not propelled forward due to a slip of at least any one of the front wheels 10 in spite of depressing the accelerator pedal. Specifically, the determination at step S2 may be made by determining whether a required drive force is greater than a predetermined value, determining whether a rotational speed of at least any one of the front wheels 10 is higher than a first predetermined speed, and determining whether a rotational speed of at least one of the rear wheels 3 is lower than a second predetermined speed.

If the vehicle 1 is propelled forward or the front wheels 10 grips the road surface without slipping so that the answer of step S2 is NO, the routine progresses to step S3 to execute the normal torque distribution control, and thereafter returns. In this case, if, for example, the vehicle 1 cannot be propelled forward due to slip of at least one of the rear wheels 3, the vehicle 1 is propelled forward by reducing the torque of the engine 2 while increasing the torque of the drive motor 11 so as to allow the slipping rear wheel(s) 3 to grip the road surface. If the front wheel(s) 10 slip(s) as a result of thus increasing the torque of the drive motor 11, it is also possible to allow the slipping rear wheel(s) 3 to grip the road surface by only reducing the torque of the engine 2 without maintaining the required drive force. In this case, if the vehicle 1 is propelled forward by an inertia force although at least one of the front wheels 10 slip(s), the torque distribution ratio will not be changed. Instead, the slipping front wheel(s) 10 may be allowed to grip the road surface by reducing the torque of the drive motor 11 while increasing the torque of the engine 2.

By contrast, if the vehicle is stuck due to a slip of e.g., the front wheel(s) 10 so that the answer of step S2 is YES, the routine progresses to step S4 to determine whether the driver is rotating the steering wheel to find out a steering angle at which the front wheel(s) 10 grip(s) the road surface. For example, such determination at step S4 may be made based on a fact that a change rate of a rotational angle of the steering wheel detected by the steering sensor 21 is equal to or greater than a predetermined value, or that the number of times to reverse a rotational direction of the steering wheel is equal to or greater than a predetermined value.

If the steering wheel is not rotated by the driver so that the answer of step S4 is NO, the routine also progresses to step S3 to execute the normal torque distribution control, and thereafter returns. In this case, the torque of the drive motor 11 is reduced while increasing the torque of the engine 2 to allow the slipping front wheel(s) 10 to grip the road surface. If the rear wheel(s) 3 is/are expected to slip as a result of increasing the torque of the engine 2, the front wheel(s) 10 may also be allowed to grip the road surface by reducing the torque of the drive motor 11 while maintaining the torque of the engine 2.

By contrast, if the steering wheel is being rotated by the driver so that the answer of step S4 is YES, the routine progresses to step S5 to restrict the execution of the automatic control of the torque distribution ratio to the front wheels 10 and the rear wheels 3, and thereafter returns. In this case, specifically, the torque distribution ratio at a point when the vehicle 1 is determined as being stuck is fixed, or a change in the torque distribution ratio at the point when the vehicle 1 is determined as being stuck is restricted within a predetermined range. For example, the predetermined range may be set to a range in which a change in the torque of the front wheel(s) 10 as a result of changing the torque distribution ratio can be restricted smaller than a minimum change in the torque of the front wheel(s) 10 possible to be achieved by operating the accelerator pedal. That is, the predetermined range may be set to a range in which a change in the torque of the front wheel(s) 10 as a result of changing the torque distribution ratio can be restricted smaller than a minimum change in the torque of the front wheel(s) 10 possible to be achieved by the driver's own discretion. Thus, at step S5, the automatic control of the torque distribution ratio to the front wheels 10 and the rear wheels 3 is restricted. However, when an operating amount of the accelerator pedal is changed, the engine 2 and the drive motor 11 are controlled based on the operating amount of the accelerator pedal to achieve a required trove force in accordance with the fixed torque distribution ratio. That is, the torques of the engine 2 and the drive motor 11 will not be restricted.

In this case, therefore, the torque of the front wheels 10 will not be changed automatically against the driver's intention. According to the exemplary embodiment of the present disclosure, therefore, the driver is allowed to find out the steering angle at which the front wheel(s) 10 grip(s) the bumpy road surface by rotating the steering wheel. In addition, the steering angle at which the front wheel(s) 10 grip(s) the bumpy road surface can be found by rotating the steering wheel even when the torque delivered to the rear wheels 3 is increased to the limit torque at which the rear wheels 3 slip. According to the exemplary embodiment of the present disclosure, therefore, the vehicle being stuck on the bumpy road may be propelled again without reducing the drive force excessively. For example, the restriction on automatic control of the torque distribution ratio may be canceled based on a fact that the slip of the wheel has not been detected for a predetermined period of time.

Although the above exemplary embodiments of the present disclosure have been described, it will be understood by those skilled in the art that the present disclosure should not be limited to the described exemplary embodiments, and various changes and modifications can be made within the scope of the present disclosure. For example, the drive force control system according to the exemplary embodiment of the present disclosure may also be applied to a hybrid vehicle in which a transfer having a clutch is disposed between the engine and the rear wheels, and the engine torque is also delivered to the front wheels. In this case, the torques distributed to the front wheels and the rear wheels may be controlled by changing a torque transmitting capacity of the clutch. In this case, when the front wheel slip and the steering wheel is rotated, a change in the torque transmitting capacity of the clutch may be restricted.

Here, in an in-wheel motor vehicle in which a drive motor is arranged in each wheel, and a vehicle in which a differential action of a differential gear unit can be restricted, torques of the right wheel and the left wheel may be controlled independently. In those kinds of vehicles, if a torque distribution ratio to the right wheel and the left wheel of the pair of wheels steered by the steering wheel is changed when the steering wheel is rotated in the event of a slip of those wheels, the driver may not determine whether the slipping wheel(s) is/are allowed to grip the road surface again by rotating the steering wheel to turn the slipping wheel(s), or by changing a torque distribution ratio to the right wheel and the left wheel automatically. In those kinds of vehicles, therefore, it is preferable to restrict a change in the torque distribution ratio to the right wheel and the left wheel in the event of a slip of the pair of wheels steered by the steering wheel.

What is claimed is:

1. A drive force control system for a vehicle, comprising:
   a prime mover;
   a pair of wheels that is rotated by a torque delivered from the prime mover and that is turned by operating a steering wheel; and
   another pair of wheels that is rotated by a torque delivered from the prime mover or another prime mover,
   wherein a torque distribution ratio to the pair of wheels and the another pair of wheels is changeable,
   the drive force control system comprises a controller that controls the torque distribution ratio, and
   the controller is configured to
   determine whether the vehicle cannot be propelled due to a slip of the pair of wheels steered by the steering wheel,
   determine that a steering angle of the pair of wheels is changed by operating the steering wheel to allow the pair of wheels to grip a road surface, and
   restrict a control to change the torque distribution ratio to the pair of wheels steered by the steering wheel and the another pair of wheels in the event of the slip of the pair of wheels, if the steering angle of the pair of wheels is changed to allow the pair of wheels to grip the road surface.

2. The drive force control system for the vehicle as claimed in claim 1,
   wherein the prime mover is connected to the pair of wheels that is turned by operating the steering wheel,
   the another prime mover is connected to the another pair of wheels, and
   the torque distribution ratio to the pair of wheels and the another pair of wheels is changed by changing the torques generated by the prime mover and the another prime mover.

3. The drive force control system for the vehicle as claimed in claim 2, wherein the prime mover includes a motor, and the another prime mover includes an engine.

4. The drive control system for the vehicle as claimed in claim 1, wherein the controller is further configured to determine that the vehicle cannot be propelled due to the slip of the pair of wheels steered by the steering wheel, if a rotational speed of the pair of wheels is higher than a first predetermined speed and a rotational speed of the another pair of wheels is lower than a second predetermined speed.

5. The drive control system for the vehicle as claimed in claim 2, wherein the controller is further configured to determine that the vehicle cannot be propelled due to the slip of the pair of wheels steered by the steering wheel, if a rotational speed of the pair of wheels is higher than a first predetermined speed and a rotational speed of the another pair of wheels is lower than a second predetermined speed.

6. The drive control system for the vehicle as claimed in claim 3, wherein the controller is further configured to determine that the vehicle cannot be propelled due to the slip of the pair of wheels steered by the steering wheel, if a rotational speed of the pair of wheels is higher than a first predetermined speed and a rotational speed of the another pair of wheels is lower than a second predetermined speed.

7. The drive force control system for the vehicle as claimed in claim 1, wherein controller is further configured to determine that the steering angle of the pair of wheels is changed by operating the steering wheel to allow the pair of wheels to grip the road surface, if a change rate of a rotational angle of the steering wheel is equal to or greater than a predetermined rate.

8. The drive force control system for the vehicle as claimed in claim 2, wherein controller is further configured to determine that the steering angle of the pair of wheels is changed by operating the steering wheel to allow the pair of wheels to grip the road surface, if a change rate of a rotational angle of the steering wheel is equal to or greater than a predetermined rate.

9. The drive force control system for the vehicle as claimed in claim 3, wherein controller is further configured to determine that the steering angle of the pair of wheels is changed by operating the steering wheel to allow the pair of wheels to grip the road surface, if a change rate of a rotational angle of the steering wheel is equal to or greater than a predetermined rate.

10. The drive force control system for the vehicle as claimed in claim 4, wherein controller is further configured to determine that the steering angle of the pair of wheels is changed by operating the steering wheel to allow the pair of wheels to grip the road surface, if a change rate of a rotational angle of the steering wheel is equal to or greater than a predetermined rate.

11. The drive force control system for the vehicle as claimed in claim 5, wherein controller is further configured to determine that the steering angle of the pair of wheels is changed by operating the steering wheel to allow the pair of wheels to grip the road surface, if a change rate of a rotational angle of the steering wheel is equal to or greater than a predetermined rate.

12. The drive force control system for the vehicle as claimed in claim 6, wherein controller is further configured to determine that the steering angle of the pair of wheels is changed by operating the steering wheel to allow the pair of wheels to grip the road surface, if a change rate of a rotational angle of the steering wheel is equal to or greater than a predetermined rate.

* * * * *